US012568529B2

(12) United States Patent
Si et al.

(10) Patent No.: US 12,568,529 B2
(45) Date of Patent: Mar. 3, 2026

(54) METHOD AND APPARATUS OF SEMI-STATIC MODE SIDELINK CHANNEL ACCESS

(71) Applicant: Samsung Electronics Co., Ltd., Suwon-si (KR)

(72) Inventors: Hongbo Si, Plano, TX (US); Emad N. Farag, Flanders, NJ (US); Carmela Cozzo, San Diego, CA (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/192,608

(22) Filed: Mar. 29, 2023

(65) Prior Publication Data

US 2023/0328778 A1      Oct. 12, 2023

Related U.S. Application Data

(60) Provisional application No. 63/330,227, filed on Apr. 12, 2022, provisional application No. 63/330,235, filed on Apr. 12, 2022.

(51) Int. Cl.
*H04W 74/0808* (2024.01)

(52) U.S. Cl.
CPC ............................... *H04W 74/0808* (2013.01)

(58) Field of Classification Search
CPC .................................................. H04W 74/0808
See application file for complete search history.

(56) References Cited

U.S. PATENT DOCUMENTS

| | | | |
|---|---|---|---|
| 2021/0195637 A1 | 6/2021 | Xue et al. | |
| 2022/0061095 A1 | 2/2022 | Xue et al. | |
| 2022/0070918 A1* | 3/2022 | Fan | H04W 74/0808 |
| 2022/0086911 A1* | 3/2022 | Oh | H04W 72/0453 |

FOREIGN PATENT DOCUMENTS

WO        2022061754 A1      3/2022

OTHER PUBLICATIONS

International Search Report and Written Opinion issued Jul. 10, 2023 regarding International Application No. PCT/KR2023/ 004959, 7 pages.

(Continued)

*Primary Examiner* — Myron Wyche

(57) ABSTRACT

Methods and apparatuses for initiating channel occupancy in a semi-static mode SL channel access in a wireless communication system. A method of a user equipment (UE) includes receiving, from a higher layer, an indication on a semi-static mode SL channel access, receiving a set of configurations for the semi-static mode SL channel access, including a duration of a period and determining a first portion of the period as a channel occupancy associated with the period. The method further includes determining a second portion of the period as an idle duration associated with the period, performing a SL channel access procedure in the idle duration associated with the period, and transmitting a first SL transmission over a channel in the channel occupancy associated with the period after successfully performing the SL channel access procedure.

20 Claims, 7 Drawing Sheets

(56)         References Cited

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 38.331 V16.1.0, Jul. 2020, 886 pages.

* cited by examiner

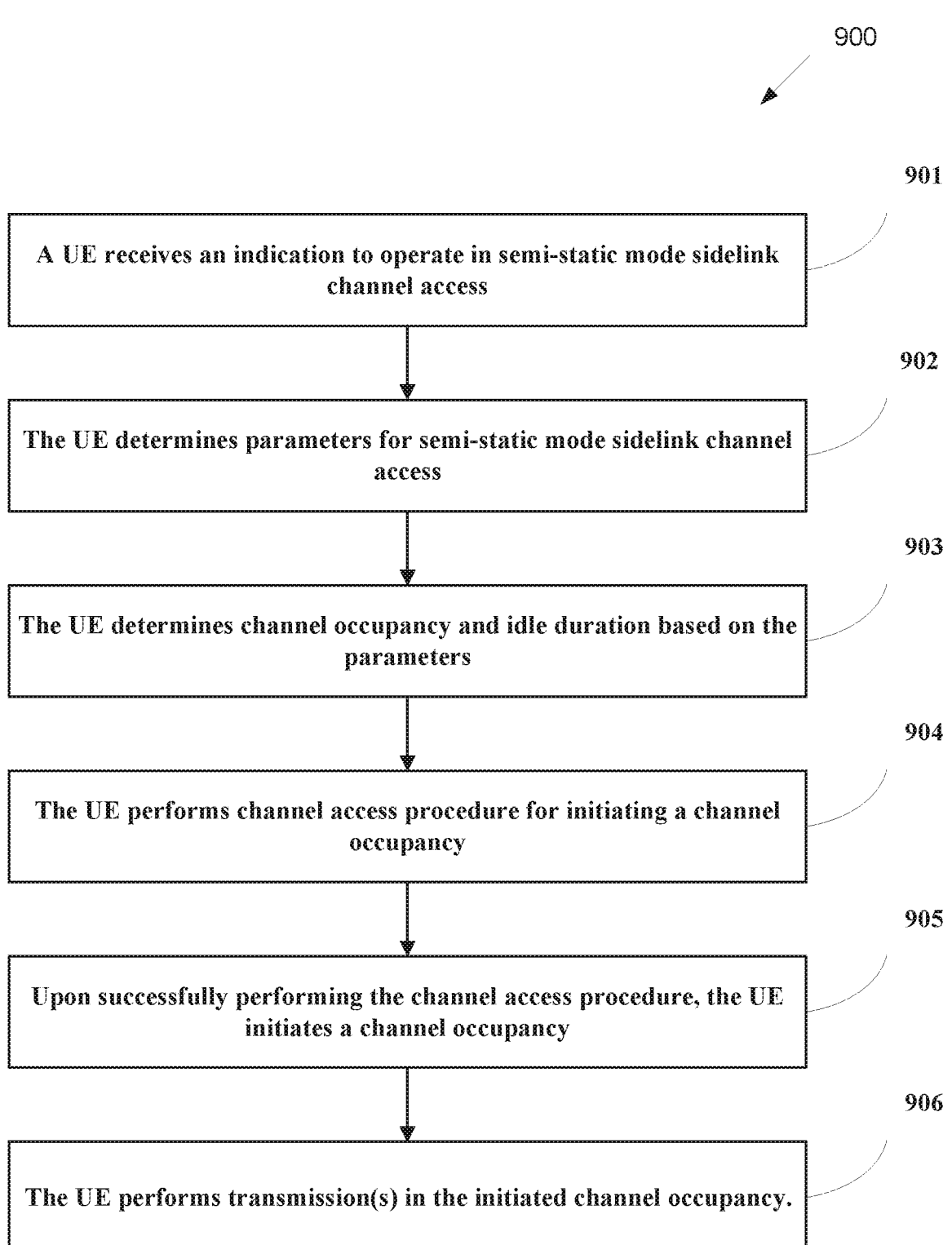

900

901

A UE receives an indication to operate in semi-static mode sidelink channel access

902

The UE determines parameters for semi-static mode sidelink channel access

903

The UE determines channel occupancy and idle duration based on the parameters

904

The UE performs channel access procedure for initiating a channel occupancy

905

Upon successfully performing the channel access procedure, the UE initiates a channel occupancy

906

The UE performs transmission(s) in the initiated channel occupancy.

FIG. 9

1000 gap

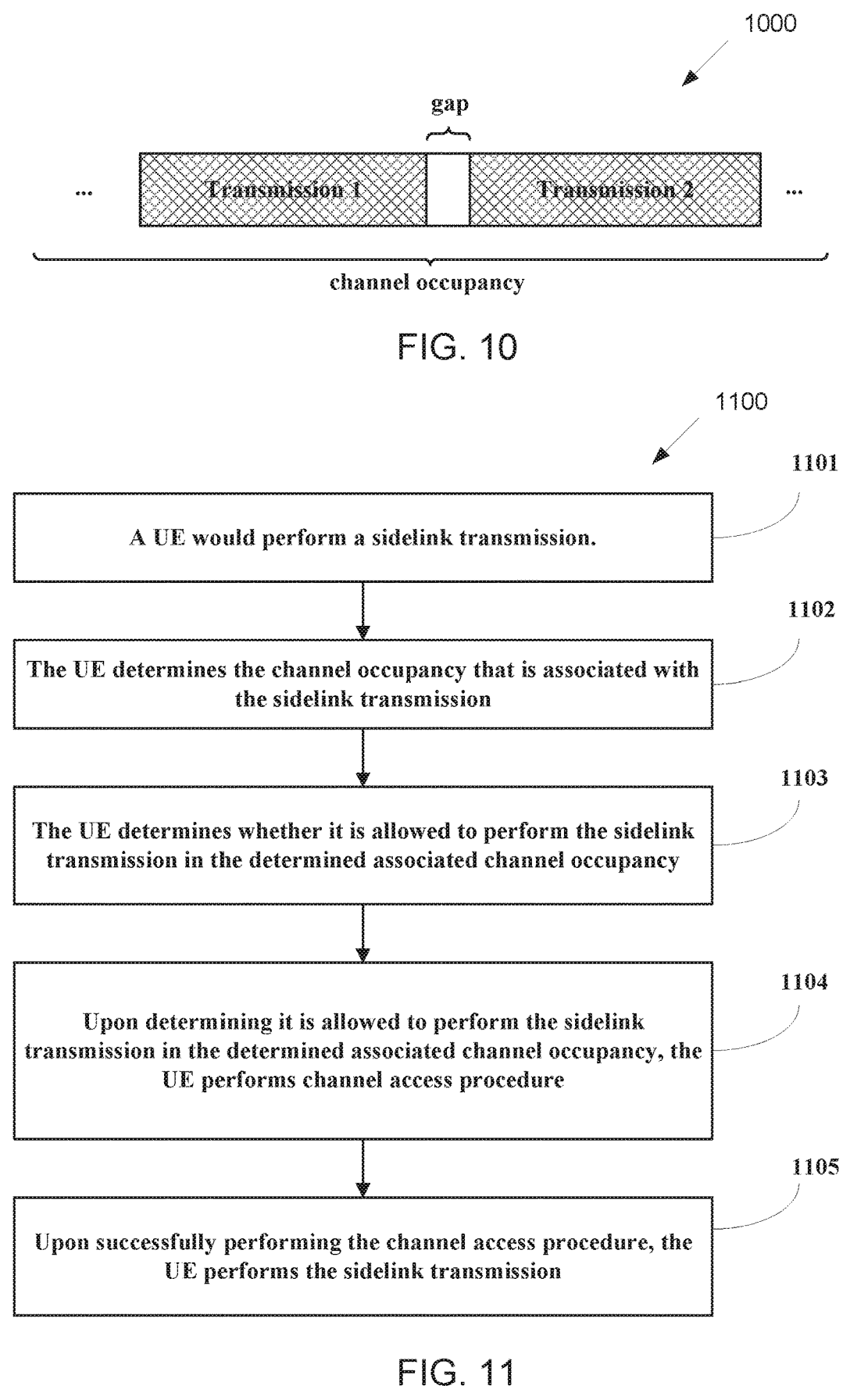

| Transmission 1 | | Transmission 2 |

...          ...

channel occupancy

A UE would perform a sidelink transmission.

1102

The UE determines the channel occupancy that is associated with the sidelink transmission

1103

The UE determines whether it is allowed to perform the sidelink transmission in the determined associated channel occupancy

1104

Upon determining it is allowed to perform the sidelink transmission in the determined associated channel occupancy, the UE performs channel access procedure

1105

Upon successfully performing the channel access procedure, the UE performs the sidelink transmission

FIG. 11

METHOD AND APPARATUS OF SEMI-STATIC MODE SIDELINK CHANNEL ACCESS

CROSS-REFERENCE TO RELATED APPLICATIONS AND CLAIM OF PRIORITY

The present application claims priority to U.S. Provisional Patent Application No. 63/330,227, filed on Apr. 12, 2022, and U.S. Provisional Patent Application No. 63/330,235, filed on Apr. 12, 2022. The contents of the above-identified patent document is incorporated herein by reference.

TECHNICAL FIELD

The present disclosure relates generally to wireless communication systems and, more specifically, the present disclosure relates to an initiating channel occupancy in a semi-static mode sidelink (SL) channel access in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an initiating channel occupancy in a semi-static mode SL channel access in a wireless communication system.

In one embodiment, a user equipment (UE) in a wireless communication system is provided. The UE includes a transceiver configured to receive, from a higher layer, an indication on a semi-static mode SL channel access and receive a set of configurations for the semi-static mode SL channel access. The set of configurations includes a duration of a period. The UE further includes a processor operably coupled to the transceiver. The processor is configured to determine a first portion of the period as a channel occupancy associated with the period, determine a second portion of the period as an idle duration associated with the period, and perform a SL channel access procedure in the idle duration associated with the period. The transceiver is further configured to transmit a first SL transmission over a channel in the channel occupancy associated with the period after successfully performing the SL channel access procedure.

In another embodiment, a method of a UE in a wireless communication system is provided. The method includes receiving, from a higher layer, an indication on a semi-static mode SL channel access, receiving a set of configurations for the semi-static mode SL channel access, and determining a first portion of the period as a channel occupancy associated with the period. The set of configurations includes a duration of a period. The method further includes determining a second portion of the period as an idle duration associated with the period, performing a SL channel access procedure in the idle duration associated with the period, and transmitting a first SL transmission over a channel in the channel occupancy associated with the period after successfully performing the SL channel access procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a flowchart of UE method for a semi-static mode sidelink channel access according to embodiments of the present disclosure;

FIG. 10 illustrates an example of channel occupancy sharing according to embodiments of the present disclosure; and FIG. 11 illustrates a flowchart of UE method for a channel occupancy sharing in semi-static mode sidelink channel access according to embodiments of the present disclosure.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR; Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214 v16.6.0, "NR; Physical Layer Procedures for Data"; and 3GPP TS 38.331 v16.6.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, embodiments of the present disclosure may also be applied to deployment of 5G communication systems, 6G or even later releases which may use terahertz (THz) bands.

Figure 1:
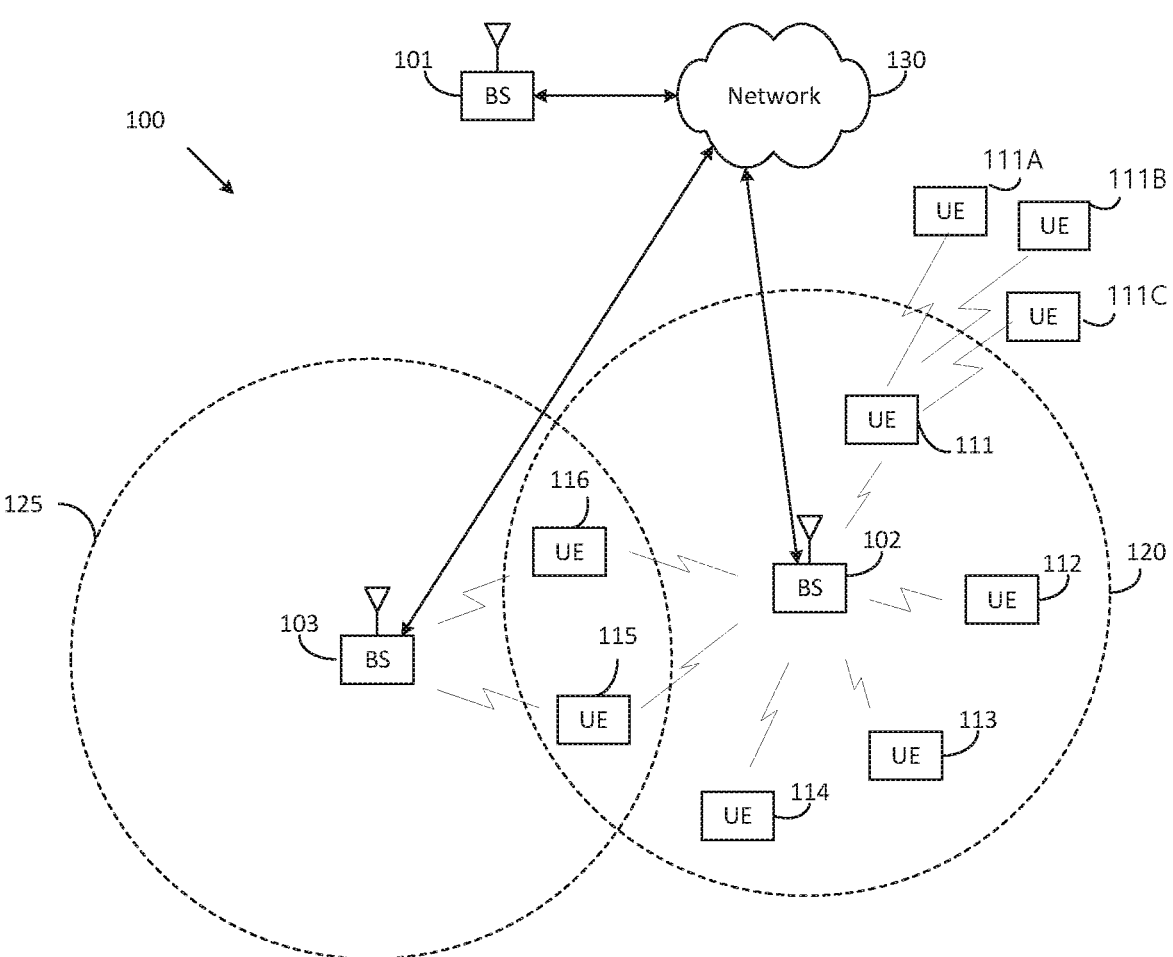
FIG. 1 illustrates an example of wireless network according to embodiments of the present disclosure.
Figure 2:
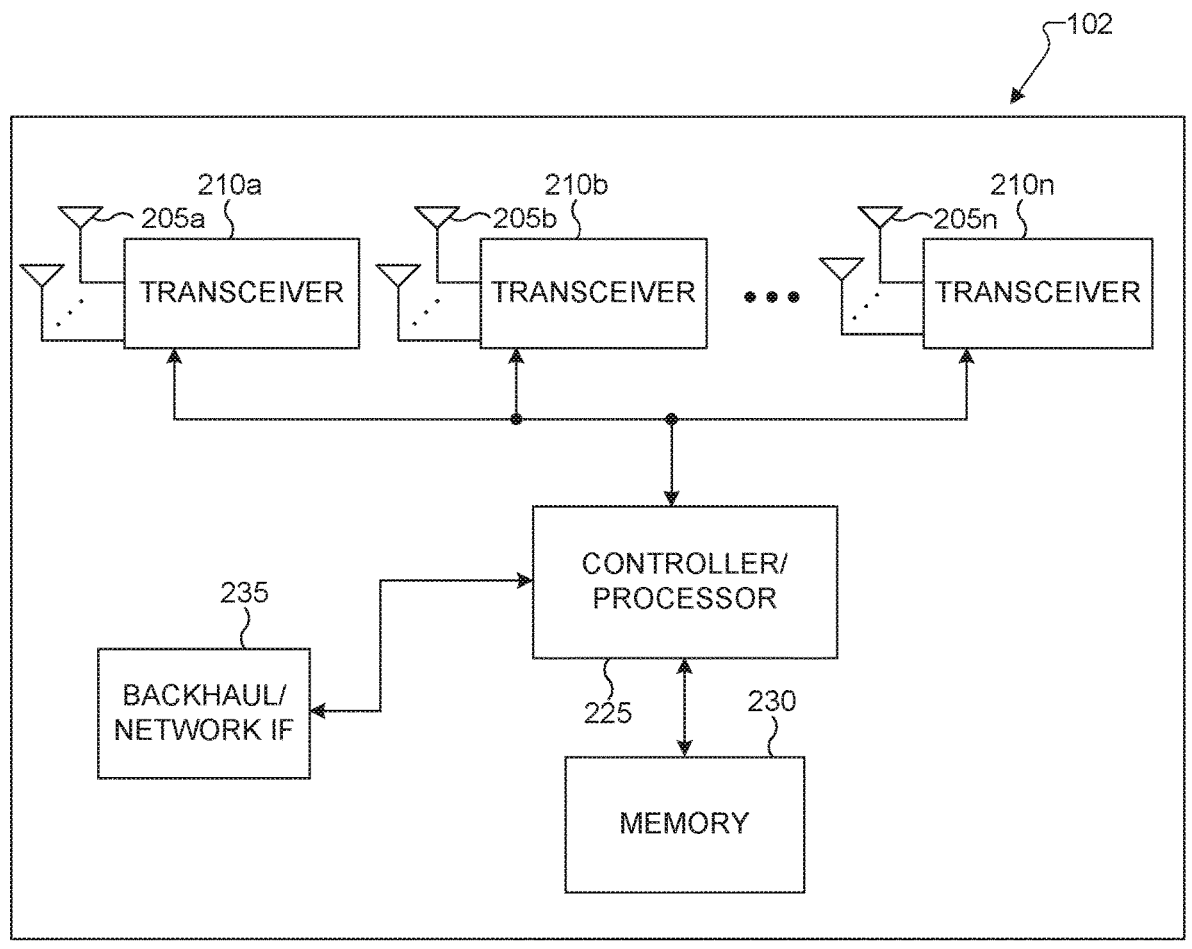
FIG. 2 illustrates an example of gNB according to embodiments of the present disclosure.
Figure 3:
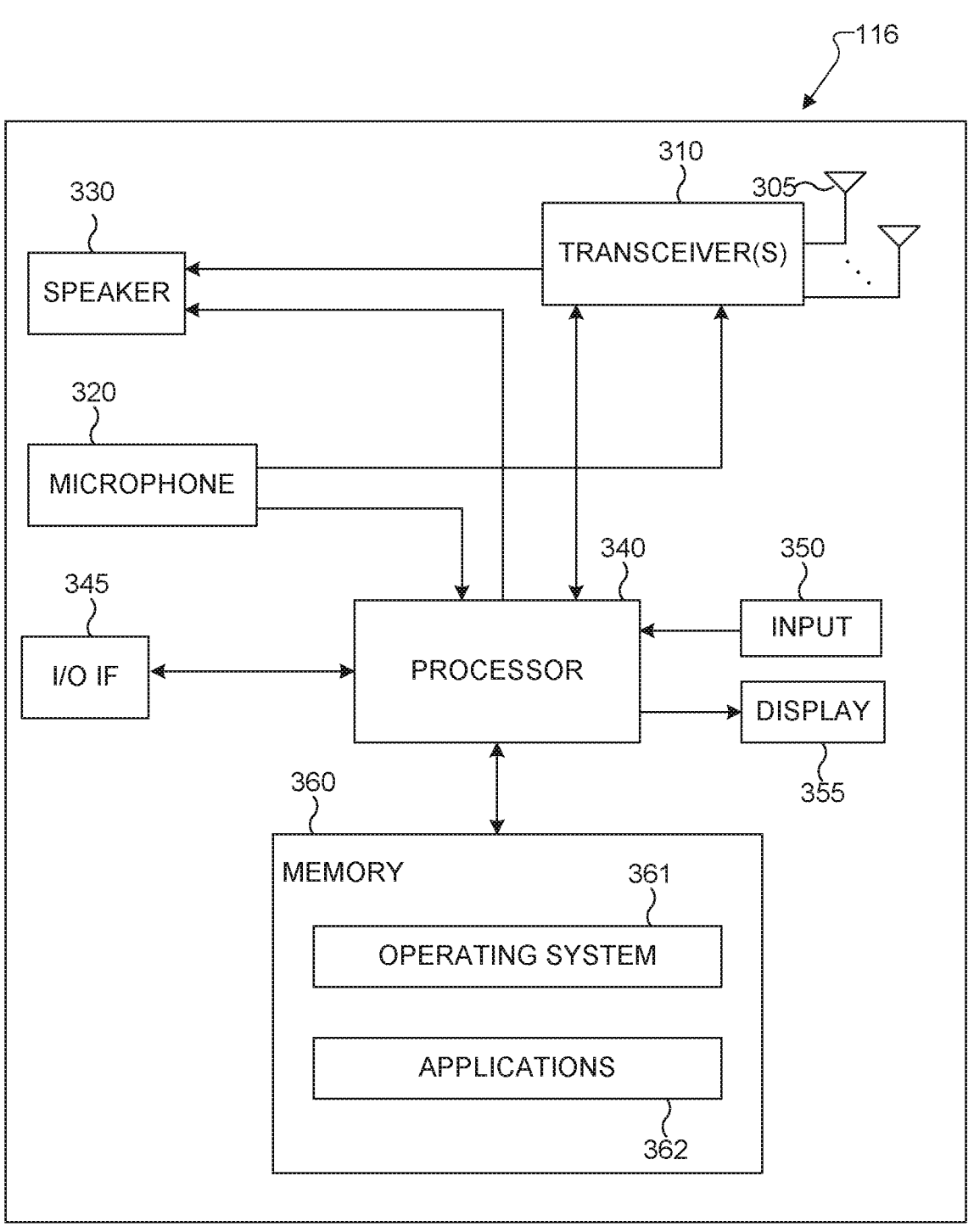
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an initiating channel occupancy in a semi-static mode SL channel access in a wireless communication system. In certain embodiments, and one or more of the gNBs 101-103 includes circuitry, programing, or a combination thereof, for time domain enhancement for an initiating channel occupancy in a semi-static mode SL channel access in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting channel occupancy in a semi-static mode SL channel access in a wireless communication system. The controller/processor 225 can move data into or out of the memory 230 as required by an executing process. The controller/processor 225 is also capable of executing programs and other processes resident in the memory 230, such as processes for an initiating channel occupancy in a semi-static mode sidelink channel access in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for an initiating channel occupancy in a semi-static mode SL channel access in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
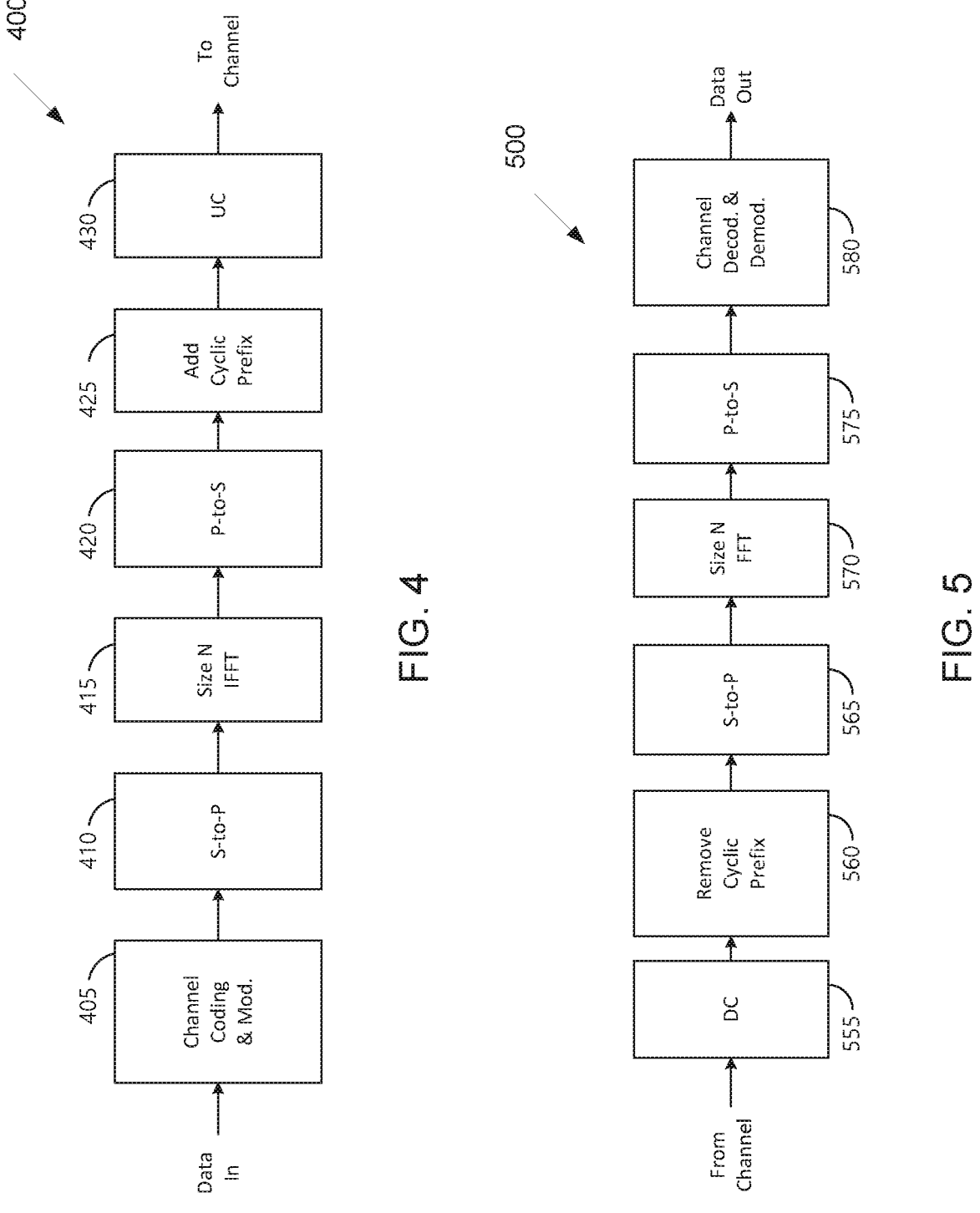
FIGS. 4 and 5 illustrate example of wireless transmit and receive paths according to the present disclosure.

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support initiating of channel occupancy in a semi-static mode SL channel access in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In Rel-16, NR is supported on unlicensed or shared spectrum, and a semi-static mode can be configured for a gNB, wherein the gNB can initiate a channel occupancy (CO) by performing a sensing on the channel, and potentially share the CO with its UE for uplink transmission. In Rel-17, it is further supported that a semi-static mode can be configured for a UE, wherein a UE can initiate a channel occupancy by performing a sensing on the channel, and potentially share the CO with its gNB for downlink transmission.

For both cases, a semi-static mode includes a configurable period length, wherein a portion of the period is for channel occupancy, and the remaining portion of the period is without any transmission allowed. Within the channel occupancy, if a transmission burst ends, and another transmission burst starts with a potential gap, the transmitter may be required to perform a channel sensing procedure within the gap. An illustration of the semi-static mode sidelink channel access is shown in FIG. 6.

Figure 6:
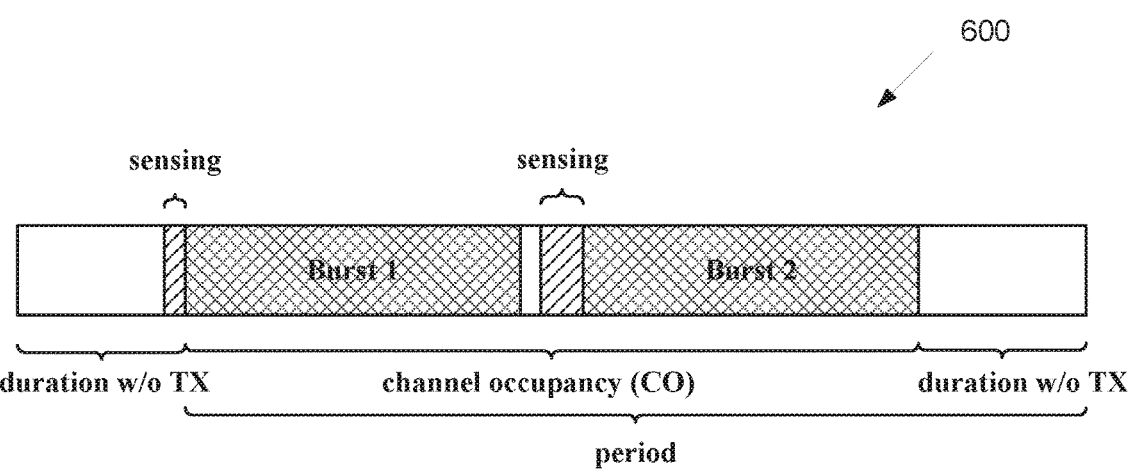
FIG. 6 illustrates an example of semi-static mode sidelink channel access according to embodiments of the present disclosure.

FIG. 6 illustrates an example of semi-static mode sidelink channel access 600 according to embodiments of the present disclosure. An embodiment of the semi-static mode sidelink channel access 600 shown in FIG. 6 is for illustration only.

For a sidelink operation on unlicensed or shared spectrum, there is a need to support the semi-static mode sidelink channel access operation, especially for the case that other RAT is guaranteed to be absent. The embodiments and examples in the present disclosure can be supported separately or combined. The embodiments and examples in the present disclosure can be supported for a semi-static mode, but can also be supported to a dynamic mode if applicable.

The present disclosure includes embodiments for initiating channel occupancy for a semi-static mode, and includes the following aspects: (1) an indication of absence of other RAT; (2) an indication of semi-static mode parameters; (3) a sidelink resource pool for a semi-static mode; (4) a channel access procedure for initiating a channel occupancy; (5) a first transmission in a channel occupancy for a semi-static mode; and (6) an example UE procedure.

The motivation to support a semi-static mode, is the guaranteed absence of other RAT on the same frequency. For this purpose, there could be an indication of the absence of other RAT sharing the channel supported, and its utilization could be applicable for the semi-static mode sidelink channel access, but not limited to the semi-static mode sidelink channel access.

In one embodiment, an indication of whether any other RAT sharing the channel is absent or not can be supported.

For one example, the indication can be included in a pre-configuration for a sidelink operation. For this example, a UE may use the information on geographical area to determine the associated indication on whether any other RAT sharing the channel is absent or not. For one further example, the determination of the associated indication on whether any other RAT sharing the channel is absent or not based on the information on geographical area can use a separate procedure from the determination of other associated radio parameters for sidelink operation (e.g., information related to sidelink resource pool) based on the information on a geographical area.

For another example, the indication can be included in the sidelink master information block (e.g., system information transmitted by a UE via SL-broadcasting channel (SL-BCH)). For this example, one bit from the reserved bits can be utilized to indicate whether any other RAT sharing the channel is absent or not.

For yet another example, the indication can be included in the PC5 RRC parameters transmitted by a UE (e.g., applied to a unicast sidelink transmission). For this example, one field (e.g., one bit) can be utilized to indicate whether any other RAT sharing the channel is absent or not. For one further example, the indication can be sent by a group leader UE in a group of UEs.

For yet another example, the indication can be included in the Uu RRC parameters transmitted by a gNB. For this example, one field (e.g., one bit) can be utilized to indicate whether any other RAT sharing the channel is absent or not. For one instance, the indication can be cell-specific, e.g., a common indication for all nodes in the cell. For another instance, the indication can be UE-specific. For one instance, the indication can be included in a system information block 1 (SIB 1). For another instance, the indication can be included in a dedicated RRC.

For yet another example, the indication can be included in the UE assistance information transmitted by a UE to the gNB. For this example, one field (e.g., one bit) can be utilized to indicate whether any other RAT sharing the channel is absent or not.

In one example, the indication of whether any other RAT sharing the channel is absent or not can be used for determining whether a semi-static mode sidelink channel access is applicable. For instance, if a UE determines any other RAT sharing the channel is absent according to the indication, the UE can determine the semi-static mode sidelink channel access could be used (e.g., may subject to further (pre-)configuration as described in the present disclosure), and if the UE determines any other RAT sharing the channel is not absent according to the indication, the UE can determine the semi-static mode sidelink channel access cannot be used (e.g., regardless of the further (pre-)configuration as described in the present disclosure).

In another example, the indication of whether any other RAT sharing the channel is absent or not can be used for determining the maximum channel occupancy time. For instance, if a UE determines any other RAT sharing the channel is absent according to the indication, the UE can determine the maximum channel occupancy time as $T_1$ and if the UE determines any other RAT sharing the channel is not absent according to the indication, the UE can determine the maximum channel occupancy time as $T_2$, e.g., $T_1 < T_2$.

In yet another example, the indication of whether any other RAT sharing the channel is absent or not can be used for determining the maximum energy detection threshold. For instance, if a UE determines any other RAT sharing the channel is absent according to the indication, the UE can determine the maximum energy detection threshold in a first way, and if the UE determines any other RAT sharing the channel is not absent according to the indication, the UE can determine the maximum energy detection threshold in a second way, e.g., the maximum energy detection threshold determined in the first way can be lower than the maximum energy detection threshold determined in the second way.

In yet another example, the indication of whether any other RAT sharing the channel is absent or not can be used for determining the sensing duration in a channel access procedure. For instance, if a UE determines any other RAT sharing the channel is absent according to the indication, the UE can determine the sensing duration in a channel access procedure as $D_1$, and if the UE determines any other RAT sharing the channel is not absent according to the indication, the UE can determine the sensing duration in a channel access procedure as $D_2$, e.g., $D_1 < D_2$.

For one instance, the sensing duration in the channel access procedure can be the sensing duration in a Type 2 channel access procedure (e.g., the sensing duration in Type 2A, Type 2B, or Type 2C). For another instance, the sensing duration can be indicated by a gNB and/or a UE, e.g., by a DCI format and/or SCI format correspondingly.

In yet another example, the indication of whether any other RAT sharing the channel is absent or not can be used for determining the restriction for channel occupancy sharing. For instance, if a UE determines any other RAT sharing the channel is absent according to the indication, the UE can determine the restriction for using channel occupancy sharing is more relaxed (e.g., the allowed scenarios are more), and if the UE determines any other RAT sharing the channel is not absent according to the indication, the UE can determine the restriction for using channel occupancy sharing is more restricted (e.g., the allowed scenario are less), e.g., some scenario for channel occupancy sharing can only be supported when any other RAT sharing the channel is absent according to the indication, and not supported when any other RAT sharing the channel is not absent according to the indication.

In yet another example, the indication of whether any other RAT sharing the channel is absent or not can be used for determining the window duration for maintaining the contention window size (e.g., $T_w$), e.g., the contention window size can be maintained if the transmissions in a previous burst are within the window duration (e.g., $T_w$) after the reference duration. For instance, if a UE determines any other RAT sharing the channel is absent according to the indication, the UE can determine a first value for $T_w$, and if the UE determines any other RAT sharing the channel is not absent according to the indication, the UE can determine a second value for $T_w$, e.g., the first value for $T_w$ is larger than the second value for $T_w$.

In yet another example, the indication of whether any other RAT sharing the channel is absent or not can be used for determining whether extra procession is required for multi-channel channel access. For instance, if a UE determines any other RAT sharing the channel is not absent according to the indication, the UE can be required to perform extra procession of sensing the channel or reinitializing the counter to resume the transmission, and if the UE determines any other RAT sharing the channel is not absent according to the indication, the UE may not be required to do so.

In one embodiment, at least one indication of at least one parameter for a semi-static mode sidelink channel access can be supported.

For one example, at least one indication can be included in a pre-configuration for sidelink operation. For this example, a UE may use the information on geographical area to determine the associated indication of the at least one parameter for a semi-static mode sidelink channel access. For one further example, the determination of the associated indication of the at least one parameter for a semi-static mode sidelink channel access based on the information on geographical area can use a separate procedure from the determination of other associated radio parameters for sidelink operation (e.g., information related to sidelink resource pool) based on the information on geographical area.

For another example, at least one indication can be included in the sidelink master information block (e.g., system information transmitted by a UE via SL-BCH). For this example, one or more bit from the reserved bits can be utilized to indicate the at least one parameter for a semi-static mode sidelink channel access.

For yet another example, at least one indication can be included in the PC5 RRC parameters transmitted by a UE (e.g., applied to a unicast sidelink transmission). For this example, one or more fields in the PC5 RRC parameters can be used to indicate the at least one parameter for a semi-static mode sidelink channel access. For one further example, the indication can be sent by a group leader UE in a group of UEs.

For yet another example, at least one indication can be included in the Uu RRC parameters transmitted by a gNB. For this example, one or more fields in the Uu RRC parameters can be used to indicate the at least one parameter for a semi-static mode sidelink channel access. For one instance, the indication can be cell-specific, e.g., a common indication for all nodes in the cell. For another instance, the indication can be UE-specific. For one instance, the indication can be included in SIB1. For another instance, the indication can be included in a dedicated RRC.

For yet another example, at least one indication can be included in the UE assistance information transmitted by a UE to the gNB. For this example, one or more fields in the UE assistance information can be used to indicate the at least one parameter for a semi-static mode sidelink channel access.

For yet another example, at least one indication can be included in a downlink control information (DCI) format. For this example, one or more fields in the DCI format can be used to indicate the at least one parameter for a semi-static mode sidelink channel access.

For yet another example, at least one indication can be included in a sidelink control information (SCI) format. For this example, one or more fields in the SCI format can be used to indicate the at least one parameter for a semi-static mode sidelink channel access.

For yet another example, at least one indication can be included in an uplink control information (UCI) format. For this example, one or more fields in the UCI format can be used to indicate the at least one parameter for a semi-static mode sidelink channel access.

In one example, the at least one parameter for a semi-static mode sidelink channel access can include a channel access mode. For instance, the at least one parameter for a semi-static mode sidelink channel access can include a channel access mode as a "semi-static mode," and if the parameter is not provided, the UE assumes the channel access mode is a "dynamic mode."

In another example, the at least one parameter for a semi-static mode sidelink channel access can include a period duration. An illustration of the period duration is shown in FIG. 7.

Figure 7:
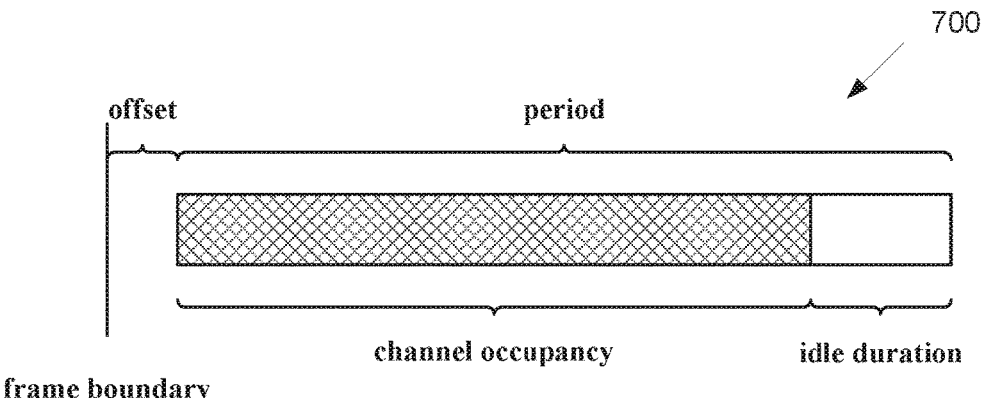
FIG. 7 illustrates an example of parameters in a semi-static mode according to embodiments of the present disclosure.

FIG. 7 illustrates an example of parameters in a semi-static mode 700 according to embodiments of the present disclosure. An embodiment of the parameters in the semi-static mode 700 shown in FIG. 7 is for illustration only.

For one instance, the value of the period can be indicated from a set of candidate values, e.g., {1 slot, 1 ms, 2 ms, 2.5 ms, 4 ms, 5 ms, 10 ms} or its subset.

For another instance, the UE can determine a channel occupancy starting from the period which does not exceed a maximum channel occupancy determined based on the period provided by the indication. For one instance, the maximum channel occupancy can be determined as $0.95 \, T_{period}$, wherein $T_{period}$ is the period provided by the indication, e.g., such that channel occupancy ratio from the regulation is satisfied. For another instance, the maximum channel occupancy can be $\min(0.95 \, T_{period}, T_{period}-100 \, us)$, wherein $T_{period}$ is the period provided by the indication. For yet another instance, the maximum channel occupancy can be $\max(0.95 \, T_{period}, T_{period}-100 \, us)$, wherein $T_{period}$ is the period provided by the indication.

For yet another instance, the UE can determine a duration without any sidelink transmission at the end of the period (e.g., also referred to as the idle duration associated with the period), wherein the duration can be determined based on the period provided by the indication. For one instance, the duration can be determined as $0.05 \, T_{period}$, wherein $T_{period}$ is the period provided by the indication. For another instance, the maximum channel occupancy can be $\min(0.05 \, T_{period}, 100 \, us)$, wherein $T_{period}$ is the period provided by the indication.

In yet another example, the at least one parameter for a semi-static mode sidelink channel access can include a duration for channel occupancy. For this example, the duration for the channel occupancy may not exceed the duration of the period. The UE can determine the remaining duration in the period, other than the duration for channel occupancy, is the idle duration. An illustration of the duration for channel occupancy is shown in FIG. 7.

In yet another example, the at least one parameter for a semi-static mode sidelink channel access can include a duration for idle duration. For this example, the duration for the idle duration may not exceed the duration of the period. The UE can determine the remaining duration in the period, other than the duration for the idle duration, is the channel occupancy. An illustration of the duration for idle duration is shown in FIG. 7.

In yet another example, the at least one parameter for a semi-static mode sidelink channel access can include an offset value. An illustration of the offset value is shown in FIG. 7.

For one instance, the offset value can be indicated from a set of candidate values.

For one instance, the candidate values range from 0 to a number of symbols less than the period provided in the same indication (after transforming the unit of the period into symbols).

For one instance, the candidate values range from 0 to a number of slots less than the period provided in the same indication (after transforming the unit of the period into slots).

For one instance, if the offset values are in the unit of symbols, there can be further restriction on the offset values such that the corresponding starting symbol of the period within a slot can be limited to a subset from $\{0, 1, \ldots, 13\}$.

For one instance, if the starting symbol of the period within a slot is restricted to S (e.g., $S \subseteq \{0, 1, \ldots, 13\}$), then the candidate values of the offset value can be $S + k \cdot N_{symb}^{slot}$, wherein k is an integer with $0 \leq k \leq k_{max}$, $N_{symb}^{slot}$ is the number of symbols in a slot (e.g., $N_{symb}^{slot} = 14$ for normal CP and/or $N_{symb}^{slot} = 12$ for extended CP), and $k_{max} = T_{period} \cdot 2^\mu - 1$.

For one instance, if the offset value is provided, the UE can determine the time domain location of the first period in two radio frames according to the offset value, e.g., the starting location of the first period within two radio frames is with a number of symbols/slots apart from the start of the corresponding radio frame with even index, wherein the number of symbols/slots is provided by the offset value.

For one instance, if the offset value is not provided or not supported, the UE can assume the starting location of the first period within the two radio frames aligned with the start of the corresponding radio frame with an even index.

In yet another example, the at least one parameter for a semi-static mode sidelink channel access can include a sensing duration related to a sidelink channel access procedure.

For one instance, the sensing duration can be indicated from a set of candidate values, e.g., $\{9 \text{ us}, 16 \text{ us}\}$.

For another instance, the indicated sensing duration can be the unit for determining the sensing duration in sidelink channel access procedures, e.g., also referred to as $T_{sl}$.

For yet another instance, the indicated sensing duration can be used for initiating a channel occupancy in a semi-static mode sidelink channel access.

For yet another instance, the indicated sensing duration can be used for sensing in an interval (e.g., 25 us) between two sidelink transmission bursts within a channel occupancy in a semi-static mode sidelink channel access.

For yet another instance, the determination of the sensing duration can be subject to regulation requirement.

In yet another example, the at least one parameter for a semi-static mode sidelink channel access can include an index of cases for performing symbol duration adjustment.

For one instance, the symbol duration adjustment can be CP extension.

For another instance, the symbol duration adjustment can be performed to the first sidelink transmission within the channel occupancy.

In one example, the at least one indication of at least one parameter for a semi-static mode sidelink channel access applies if there is an indication of a semi-static mode downlink/or uplink channel access procedure (e.g., from the gNB).

In one embodiment, the sidelink resource pool can be enhanced for a semi-static mode sidelink channel access.

For one example, the time domain resources (e.g., slots or symbols) that overlap with (or are included in) the idle duration (e.g., duration without transmission) are not included in the sidelink resource pool. For this example, the UE does not expect to transmit or receive a physical sidelink shared channel (PSSCH), a physical sidelink control channel (PSCCH), a physical sidelink feedback channel (PSFCH), and sidelink reference signals in the time domain resources (e.g., slots or symbols) that overlap with (or are included in) the idle duration (e.g., duration without transmission).

For another example, the time domain resources (e.g., slots or symbols) that overlap with (or are included in) the idle duration (e.g., duration without transmission) can be included in the sidelink resource pool (e.g., maintain the method from Rel-16), and the time domain resources (e.g., slots or symbols) that overlap with (or are included in) the idle duration (e.g., duration without transmission) cannot be used for sidelink transmission.

For one instance, a UE may not reserve the time domain resources (e.g., slots or symbols) that overlap with (or are included in) the idle duration associated with the UE (e.g., duration without transmission) for a sidelink transmission.

For another instance, if a first UE identifies a second UE reserves the time domain resources (e.g., slots or symbols) that overlap with (or are included in) the idle duration associated with the second UE (e.g., duration without transmission) for a sidelink transmission, and the reserved time domain resources do not overlap with (or are included in) the idle duration associated with the first UE, then the first UE can assume the reserved time domain resources by the second UE cannot be used for sidelink transmission from the second UE, and the first UE may still select such time domain resources for its sidelink transmission.

For yet another example, if a UE may transmit a first set of sidelink signal/channel and may receive a second set of sidelink signal/channel, wherein the first set of sidelink signal/channel overlaps with the second set of sidelink signal/channel, and the first set of sidelink signal/channel overlaps with (or are included in) the idle duration associated with the UE, then the UE may receive the second set of sidelink signal/channel and drop the transmission of the first set of sidelink signal/channel, e.g., regardless of the priority value of the first set and/or the second set of sidelink signal/channel. For instance, the first set and/or the second set of sidelink signal/channel can be PSFCH.

For yet another example, if a UE may transmit a first set of sidelink signal/channel and may receive a second set of sidelink signal/channel, wherein the first set of sidelink signal/channel overlaps with the second set of sidelink signal/channel, and the first set of sidelink signal/channel overlaps with (or are included in) the channel occupancy associated with the UE, then the UE determines to either transmit the first set of sidelink signal/channel or receive the second set of sidelink signal/channel based on the sidelink priority value of the first set of sidelink signal/channel and/or the second set of sidelink signal/channel. For instance, the first set and/or the second set of sidelink signal/channel can be PSFCH.

For one example, for the time duration that a UE performs channel access procedure (e.g., sensing) in the sidelink resource pool, the UE does not expect to receive sidelink signal and/or channel.

For another example, for the time duration that a UE performs channel access procedure (e.g., sensing) in the sidelink resource pool, the UE does not expect to transmit sidelink signal and/or channel.

For one embodiment, the UE may perform a channel access procedure to access the channel and initiate the channel occupancy in the semi-static mode sidelink channel access.

For one example, the UE performs a sensing with a duration of at least $T_{sl}$ immediately before the channel occupancy associated with a period.

For one example, if the sensing is idle, the UE can perform the first sidelink transmission on the channel within the channel occupancy associated with that period.

For another example, if the sensing is busy, the UE can drop all sidelink transmissions on the channel within the channel occupancy associated with that period.

For one example, the sensing duration $T_{sl} = 9$ us.

For another example, $T_{sl} = 16$ us.

For yet another example, $T_{si}$=9 us or 16 us subject to the regulation requirement.

For yet another example, the determination of the value of $T_{si}$ can be subject to an indication as described in the present disclosure.

In one embodiment, there can be a requirement on the first transmission within the channel occupancy in a semi-static mode sidelink channel access.

For one example, the UE may perform a sidelink transmission immediately on the channel (e.g., first transmission in the channel occupancy) after performing the channel access procedure to initiate a channel occupancy, wherein the start of the sidelink transmission is aligned with the start of the channel occupancy (e.g., the start of the period).

For another example, if the UE does not perform any sidelink transmission immediately on the channel after performing the channel access procedure to initiate a channel occupancy associated with a period, the UE may not transmit any sidelink transmission within the channel occupancy associated with that period.

In one example, after the UE determines not transmitting any sidelink transmission within the channel occupancy associated within that period, if a UE may transmit a first set of sidelink signal/channel and may receive a second set of sidelink signal/channel, wherein the first set of sidelink signal/channel overlaps with the second set of sidelink signal/channel, and the first set of sidelink signal/channel overlaps with (or are included in) the channel occupancy that the UE is not allowed to transmit, then the UE may receive the second set of sidelink signal/channel and drop the transmission of the first set of sidelink signal/channel, e.g., regardless of the priority value of the first set and/or the second set of sidelink signal/channel. For instance, the first set and/or the second set of sidelink signal/channel can be PSFCH.

For yet another example, CP extension is not applied to the first sidelink transmission in the channel occupancy (or period).

For yet another example, if the first slot within the channel occupancy is a full slot (e.g., with $N_{symb}^{slot}$ number of symbols), which corresponds to the case offset value is not supported or not provided or provided with a value as an integer multiple of a slot, and the first slot within the channel occupancy is not a slot included in the resource pool (e.g., excluded from the resource pool from TDD configuration, or for sidelink-synchronization signal/physical sidelink broadcast channel (S-SS/PSBCH) block transmission, or for reserved slots), then at least one of the following example UE behavior can be supported.

In one example, the UE does not expect this scenario happens: (1) in one example, the UE expects the TDD configuration may guarantee that the first slot within the channel occupancy may be semi-statically configured as UL; (2) in one example, the UE expects the configuration of S-SS/PSBCH block transmission may avoid using the first slot within the channel occupancy for S-SS/PSBCH block transmission; and (3) in one example, the UE expects the reserved slot is not the first slot within the channel occupancy.

In one example, the UE drops all sidelink transmissions within the channel occupancy of the associated period: (1) for one example, the UE drops S-SS/PSBCH block transmission in the first slot of the channel occupancy of the associated period, if the first slot is for S-SS/PSBCH block transmission and excluded from the resource pool; and (2)

for another example, the UE drops any sidelink transmission after the first slot of the channel occupancy of the associated period.

In one example, if the first slot is for S-SS/PSBCH block transmission, the UE may transmit the S-SS/PSBCH block and may continue with other sidelink transmission in the channel occupancy of the associated period.

In one example, the example UE behavior applies under the assumption that the sidelink transmission is determined to be associated with the channel occupancy of the UE. If it can be determined that the sidelink transmission located in the slot including the partial slot could be associated with another channel occupancy of another UE, then the transmission in the slot including the partial slot may not be dropped and may be transmitted in the other channel occupancy of another UE.

For yet another example, if the first slot within the channel occupancy is not a full slot (e.g., with smaller than $N_{symb}^{slot}$ number of symbols), which corresponds to the case that the offset value is provided with a value not as an integer multiple of a slot, then at least one of the following examples can apply. An illustration of the example is shown in FIG. 8.

Figure 8:
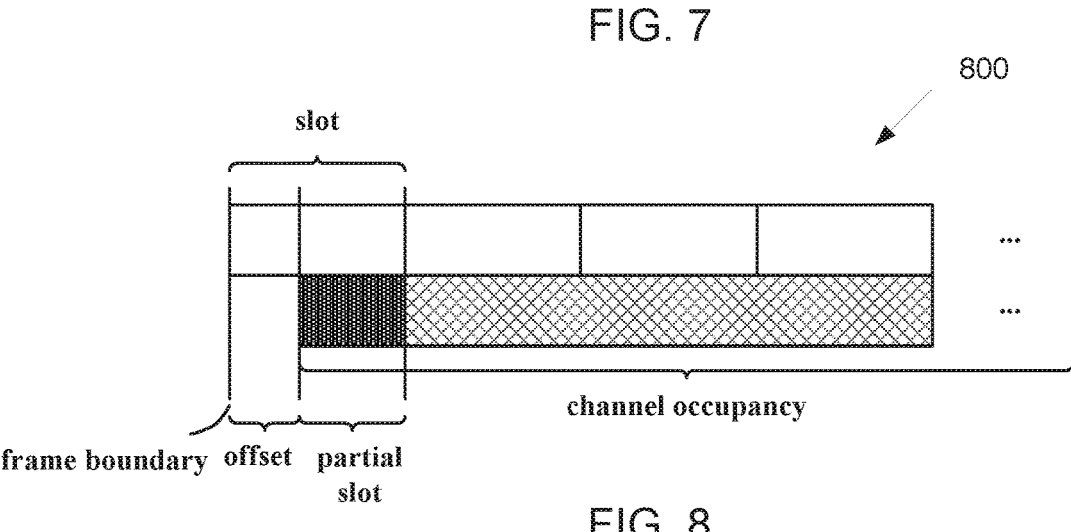
FIG. 8 illustrates an example of first slot in a channel occupancy as a partial slot according to embodiments of the present disclosure.

FIG. 8 illustrates an example of first slot in a channel occupancy as a partial slot 800 according to embodiments of the present disclosure. An embodiment of the first slot in a channel occupancy as a partial slot 800 shown in FIG. 8 is for illustration only.

In one example, the first slot within the channel occupancy is not a slot included in the resource pool (e.g., excluded from the resource pool from TDD configuration, or for S-SS/PSBCH block transmission, or for reserved slots), then at least one of the following example UE behavior can be supported.

In one example, the UE does not expect the first slot of a channel occupancy is a partial slot, e.g., the offset value is not supported or not provided or provided with a value as an integer multiple of a slot.

In one example, the UE does not expect the first slot (e.g., a partial slot) of a channel occupancy is not a slot included in the resource pool: (1) for one, the UE expects the TDD configuration may guarantee that the first slot within the channel occupancy may be semi-statically configured as UL; (2) for one example, the UE expects the configuration of S-SS/PSBCH block transmission may avoid using the first slot within the channel occupancy for S-SS/PSBCH block transmission; and (3) for one example, the UE expects the reserved slot is not the first slot within the channel occupancy.

In one example, the UE drops all sidelink transmissions within the channel occupancy of the associated period: (1) for one example, the UE drops S-SS/PSBCH block transmission in the first slot of the channel occupancy of the associated period, if the first slot is for S-SS/PSBCH block transmission and excluded from the resource pool; and (2) for one example, the UE drops any sidelink transmission after the first slot of the channel occupancy of the associated period.

In one example, if the first slot is for S-SS/PSBCH block transmission and excluded from the resource pool, the UE drops the transmission of the S-SS/PSBCH block, and the partial slot can be used for other sidelink transmission(s) (e.g., effectively as the first slot or partial slot can be included in the resource pool), wherein the other sidelink transmission(s) may start from the starting location of the channel occupancy (e.g., the first symbol of the partial slot).

In one example, the first slot within the channel occupancy is a slot included in the resource pool (or only the partial slot is defined to be included in the resource pool), then at least one of the following example UE behavior can be supported.

In one example, the UE does not expect the first slot of a channel occupancy is a partial slot, e.g., the offset value is not supported or not provided or provided with a value as an integer multiple of a slot.

In one example, the UE drops all sidelink transmissions within the channel occupancy of the associated period.

In one example, the partial slot can be used for sidelink transmission(s), wherein the sidelink transmission(s) may start from the starting location of the channel occupancy (e.g., the first symbol of the partial slot).

In one example, the example UE behavior applies under the assumption that the sidelink transmission is determined to be associated with the channel occupancy of the UE. If it can be determined that the sidelink transmission located in the slot including the partial slot could be associated with another channel occupancy of another UE, then the transmission in the slot including the partial slot may not be dropped and may be transmitted in the other channel occupancy of another UE.

FIG. 9 illustrates a flowchart of UE method 900 for a semi-static mode sidelink channel access according to embodiments of the present disclosure. For example, the UE method 900 as may be performed by a UE such as 111-116 as illustrated in FIG. 1. An embodiment of the UE method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In one embodiment, an example UE procedure for a semi-static mode sidelink channel access is shown in FIG. 9. A UE can receive an indication to operate in a semi-static mode sidelink channel access (901), and determines parameters for a semi-static mode sidelink channel access according to examples described in the present disclosure (902). The UE further determines channel occupancy and/or idle duration in a period based on the parameters for a semi-static mode sidelink channel access according to examples described in the present disclosure (903). Then, the UE performs a channel access procedure for initiating a channel occupancy (904), and upon successfully performing the channel access procedure, the UE initiates the channel occupancy (905). The UE further performs sidelink transmission(s) in the initiated channel occupancy, with potential conditions applicable for the first transmission in the channel occupancy, according to example as described in the disclosure (906).

The present disclosure includes embodiments for initiating channel occupancy for a semi-static mode, and includes the following aspects: (1) a channel occupancy sharing in a semi-static mode; (2) an indication of channel access parameter for a sidelink transmission; (3) an association between a sidelink transmission and channel occupancy: (i) for a configured sidelink transmission; (ii) for an intra-period scheduled sidelink transmission; and (iii) for a cross-period scheduled sidelink transmission; (4) multiple sidelink transmissions; (5) multi-channel transmission in a semi-static mode; and (6) an example UE procedure.

In one embodiment, a channel occupancy initiated by a first UE (e.g., CO initiating UE) after performing a channel access procedure can be shared for further transmission from the first UE and/or with at least one second UE, for a semi-static mode channel access, wherein for example the transmissions are all associated with the channel occupancy that is initiated in the period by the first UE.

FIG. 10 illustrates an example of channel occupancy sharing 1000 according to embodiments of the present disclosure. An embodiment of the channel occupancy sharing 1000 shown in FIG. 10 is for illustration only.

For one example, the first UE can perform a first sidelink transmission in the channel occupancy, and perform a second sidelink transmission after the first sidelink transmission based on at least one of the following examples (an illustration is shown in FIG. 10).

In one example, if the gap between the first sidelink transmission and the second sidelink transmission is more than a threshold (e.g., 16 us), the second sidelink transmission can be performed if the channel is sensed to be idle for at least a sensing duration of $T_{sl}$ immediately before the second sidelink transmission.

In one example, if the gap between the first sidelink transmission and the second sidelink transmission is no more than a threshold (e.g., 16 us), the second sidelink transmission can be performed without sensing the channel.

For another example, the first UE can perform a first sidelink transmission in the channel occupancy, and a second UE can perform a second sidelink transmission after the first sidelink transmission based on at least one of the following examples (an illustration is shown in FIG. 10).

In one example, if the gap between the first sidelink transmission and the second sidelink transmission is more than a threshold (e.g., 16 us), the second sidelink transmission can be performed if the channel is sensed to be idle for at least a sensing duration of $T_{sl}$ within a interval (e.g., 25 us) ending immediately before the second sidelink transmission.

In one example, if the gap between the first sidelink transmission and the second sidelink transmission is no more than a threshold (e.g., 16 us), the second sidelink transmission can be performed without sensing the channel.

In one embodiment, the first and second sidelink transmissions are both determined to be associated with the first UE.

In another embodiment, if the second transmission is performed by the second UE, the second transmission may need to satisfy at least one of the following examples.

In one example, the first transmission performed by the first UE can include unicast transmission intended for the second UE.

In one example, the first transmission performed by the first UE can include broadcast transmission.

In one example, the first transmission performed by the first UE can include groupcast transmission with the second UE as one of the receivers.

In one example, the first transmission performed by the first UE can include unicast transmission intended for other UE than the second UE.

In one example, the first transmission performed by the first UE can include groupcast transmission without the second UE as one of the receivers.

In one example, the second transmission performed by the second UE can include unicast transmission intended for the first UE.

In one example, the second transmission performed by the second UE can include broadcast transmission.

In one example, the second transmission performed by the second UE can include groupcast transmission with the first UE as one of the receivers.

In one example, the second transmission performed by the second UE can include unicast transmission intended for other UE than the first UE.

In one example, the second transmission performed by the second UE can include groupcast transmission without the first UE as one of the receivers.

In yet another embodiment, there can be further condition for at least one of above examples to be applied.

For one instance, if one of examples mentioned in the present disclosure is supported, a further condition may be satisfied that any UE may not determine to associate the second transmission performed by the second UE with a channel occupancy that is initiated by the second UE, when receiving the second transmission, wherein the association could be according to examples described in the present disclosure.

For another instance, if one of example mentioned in the present disclosure is supported, a further condition may be satisfied that any UE may determine to associate the first transmission performed by the first UE with the channel occupancy that is initiated by the first UE.

For one instance, if one of example mentioned in the present disclosure is supported, a further condition may be satisfied that any other RAT is absent on the channel (e.g., by the level of regulation and/or based on an indication as described in the present disclosure).

For another instance, one of example mentioned in the present disclosure is supported, a further condition may be satisfied that any other RAT is absent on the channel (e.g., by the level of regulation and/or based on an indication as described in the present disclosure).

In yet another embodiment, the value $T_{sl}$ can be determined according to at least one of the following instances. For one instance, $Ts_{sl}=9$ us. For another instance, $T_{sl}=16$ us. For yet another instance, $T_{sl}=9$ us or 16 us subject to the regulation requirement. For yet another instance, the determination of the value of $T_{sl}$ can be based on an indication.

In yet another embodiment, the first sidelink transmission can be further restricted to the first sidelink transmission within the channel occupancy.

In one embodiment, there can be an indication for at least one of a channel access type (e.g., sensing duration), a symbol duration adjustment case index (e.g., CP extension), or an indicator of the channel occupancy associated with the sidelink transmission for the semi-static mode channel access.

In one example, the UE can be provided with the indication by a DCI format and/or a SCI format, e.g., for a scheduled sidelink transmission and/or a configured sidelink transmission.

In another example, the UE can be provided with the indication by a pre-configuration and/or Uu RRC parameter and/or PC5 RRC parameter, e.g., for a configured sidelink transmission.

In one example, the indication for at least one of a channel access type (e.g., sensing duration), a symbol duration adjustment case index (e.g., CP extension), or an indicator of the channel occupancy associated with the sidelink transmission for the semi-static mode channel access could be applicable to the first transmission within the channel occupancy for the semi-static mode.

In another example, the indication for at least one of a channel access type (e.g., sensing duration), a symbol duration adjustment case index (e.g., CP extension), or an indicator of the channel occupancy associated with the sidelink transmission for the semi-static mode channel access could be applicable to the transmission other than the first transmission within the channel occupancy for the semi-static mode.

In one example, the indication (e.g., in the SCI format and/or DCI format for scheduled sidelink transmission(s)) can be according to the example in TABLE 1.

For one example, the UE #1 can be a UE initiating a channel occupancy and shared to the UE that may transmit the sidelink transmission (e.g., scheduled sidelink transmission), wherein for one example, the UE initiating the channel occupancy could be the transmitter of the SCI format, or for another example, the UE initiating the channel occupancy could be indicated in the SCI format. When a UE is provided with the indicator of the channel occupancy associated with the sidelink transmission as UE #1, the UE assumes the channel occupancy is initiated by the UE #1 and shared to the UE. The associated sensing for the channel access type is a potential sensing within the channel occupancy according to example of the present disclosure.

For another example, the UE #2 can be UE that may transmit the sidelink transmission (e.g., scheduled sidelink transmission). When a UE is provided with the indicator of the channel occupancy associated with the sidelink transmission as UE #2, the UE assumes the channel occupancy can be initiated by the UE itself. The associated sensing for the channel access type can be either a sensing before initiating a channel occupancy or a potential sensing within the channel occupancy, depending on whether the sidelink transmission is a first or after the first transmission in the channel occupancy, respectively, according to example of the present disclosure.

TABLE 1

| Example indication in SCI format and/or DCI format | | | |
|---|---|---|---|
| Index | Channel Access Type | CP extension index | Indicator of the channel occupancy associated with the sidelink transmission |
| 0 | No sensing | 0 | UE#1 |
| 1 | No sensing | 2 | UE#1 |
| 2 | Sensing | 0 | UE#1 |
| 3 | Sensing | 0 | UE#2 |

In another example, the indication (e.g., a pre-configuration and/or Uu RRC parameter and/or PC5 RRC parameter for configured sidelink transmission(s)) can be a table wherein a row of the table can be either used for indicating the channel occupancy sharing information is not available or for indicating the channel occupancy sharing information including at least one of a duration or an offset. A UE can be provided an index of the table by an indication (e.g., in the SCI format and/or DCI format for configured sidelink transmission(s)) in slot n and determines an offset O and/or a duration D, the UE assumes the slots starting from n+O and with a duration of D can be used for sidelink transmission. In one further example, the UE may further assume an index for symbol duration adjustment (e.g., CP exertion) based on an indication (e.g., provided by a pre-configuration and/or Uu RRC parameter and/or PC5 RRC parameter) to be applied to the sidelink transmissions.

In one embodiment, if a first UE shares its initiated channel occupancy with a second UE in a semi-static mode, and the second UE may initiate its own channel occupancy on the same channel in a semi-static mode, there could be a need to clarify the association between the sidelink transmission from the second UE and the channel occupancy, e.g., either from the first UE or the second UE, since the channel access procedure for the two association results could be different and/or the idle duration of the periods may not be aligned.

In one example, a UE can be configured with a sidelink transmission, and the configured sidelink transmission can be determined to be associated with the UE's channel occupancy or another UE's channel occupancy, according to the embodiments and examples in the present disclosure.

In one embodiment, when a UE is configured with a sidelink transmission, and the configured sidelink transmission may occur at the beginning of a period $T_{period}$ and may end before the idle duration corresponding to that period, wherein the period $T_{period}$ is for the UE's own semi-static mode channel access, at least one of the following example can be applied.

In one example, if the configured sidelink transmission may occur within a period $T'_{period}$ and may end before the idle duration corresponding to that period, wherein the period $T'_{period}$ is for another UE's semi-static mode channel access, and if the UE determines the another UE has initiated a channel occupancy in the period $T'_{period}$ and shares its channel occupancy to the UE according to examples described in the present disclosure, the UE assumes the configured sidelink transmission is associated with a channel occupancy initiated by the another UE.

In another example, if the UE cannot determine that another UE has initiated a channel occupancy in the period $T'_{period}$ and shares its channel occupancy to the UE according to examples described in the present disclosure, the UE assumes the configured sidelink transmission is associated with the channel occupancy initiated by the UE.

In yet another example, if the configured sidelink transmission may not occur within a period $T'_{period}$ or may not end before the idle duration corresponding to that period (e.g., overlap with the idle duration), wherein the period $T'_{period}$ is for another UE's semi-static mode channel access, the UE assumes the configured sidelink transmission is associated with the channel occupancy initiated by the UE.

In yet another example, the UE assumes the configured sidelink transmission is associated with the channel occupancy initiated by the UE, e.g., regardless of whether there is another channel occupancy shared to the UE.

In another embodiment, when a UE is configured with a sidelink transmission, and the configured sidelink transmission may occur at the beginning of a period $T_{period}$ and may not end before the idle duration corresponding to that period (e.g., overlap with idle duration), wherein the period $T_{period}$ is for the UE's own semi-static mode channel access, at least one of the following example can be applied.

In one example, if the configured sidelink transmission may occur within a period $T'_{period}$ and may end before the idle duration corresponding to that period, wherein the period $T'_{period}$ is for another UE's semi-static mode channel access, and if the UE determines the another UE has initiated a channel occupancy in the period $T'_{period}$ and shares its channel occupancy to the UE according to examples described in the present disclosure, the UE assumes the configured sidelink transmission is associated with a channel occupancy initiated by the other UE.

In another example, if the UE cannot determine that another UE has initiated a channel occupancy in the period $T'_{period}$ and shares its channel occupancy to the UE according to examples described in the present disclosure, the UE drops the configured sidelink transmission.

In yet another example, if the configured sidelink transmission may not occur within a period $T'_{period}$ or may not end before the idle duration corresponding to that period (e.g., overlap with the idle duration), wherein the period $T'_{period}$ is for another UE's semi-static mode channel access, the UE drops the configured sidelink transmission.

In yet another example, the UE drops the configured sidelink transmission, e.g., regardless of whether there is another channel occupancy shared to the UE.

In yet another embodiment, when a UE is configured with a sidelink transmission, and the configured sidelink transmission may occur after the beginning of a period $T_{period}$ (e.g., not first transmission in the period) and may end before the idle duration corresponding to that period, wherein the period $T_{period}$ is for the UE's own semi-static mode channel access, at least one of the following example can be applied.

In one example, if the UE has already initiated a channel occupancy in the period $T_{period}$ according to example described in the present disclosure, the UE assumes the configured sidelink transmission is associated with a channel occupancy initiated by the UE.

In another example, if the UE has not initiated a channel occupancy in the period, and if the configured sidelink transmission may occur within a period $T'_{period}$ and may end before the idle duration corresponding to that period, wherein the period $T'_{period}$ is for another UE's semi-static mode channel access, and if the UE determines the another UE has initiated a channel occupancy in the period $T'_{period}$ and shares its channel occupancy to the UE according to examples described in the present disclosure, the UE assumes the configured sidelink transmission is associated with a channel occupancy initiated by the another UE.

In yet another example, if the UE has not initiated a channel occupancy in the period, and if the UE cannot determine that another UE has initiated a channel occupancy in the period $T'_{period}$ and shares its channel occupancy to the UE according to examples described in the present disclosure, the UE drops the configured sidelink transmission.

In yet another example, if the UE has not initiated a channel occupancy in the period, and if the configured sidelink transmission may not occur within a period $T'_{period}$ or may not end before the idle duration corresponding to that period (e.g., overlap with the idle duration), wherein the period $T'_{period}$ is for another UE's semi-static mode channel access, the UE drops the configured sidelink transmission.

In yet another example, if the UE has not initiated a channel occupancy in the period, the UE drops the configured sidelink transmission, e.g., regardless of whether there is another channel occupancy shared to the UE.

In yet another embodiment, when a UE is configured with a sidelink transmission, and the configured sidelink transmission may occur after the beginning of a period $T_{period}$ (e.g., not first transmission in the period) and may not end before the idle duration corresponding to that period (e.g., overlap with idle duration), wherein the period $T_{period}$ is for the UE's own semi-static mode channel access, at least one of the following example can be applied.

In one example, if the configured sidelink transmission may occur within a period $T'_{period}$ and may end before the idle duration corresponding to that period, wherein the period $T'_{period}$ is for another UE's semi-static mode channel access, and if the UE determines the another UE has initiated a channel occupancy in the period $T_{period}$ and shares its channel occupancy to the UE according to examples described in the present disclosure, the UE assumes the configured sidelink transmission is associated with a channel occupancy initiated by the other UE.

In yet another example, if the UE cannot determine another UE has initiated a channel occupancy in the period $T'_{period}$ and shares its channel occupancy to the UE according to examples described in the present disclosure, the UE drops the configured sidelink transmission.

In yet another example, if the configured sidelink transmission may not occur within a period $T'_{period}$ or may not end before the idle duration corresponding to that period (e.g., overlap with the idle duration), wherein the period $T'_{period}$ is for another UE's semi-static mode channel access, the UE drops the configured sidelink transmission.

In yet another example, the UE drops the configured sidelink transmission, e.g., regardless of whether there is another channel occupancy shared to the UE.

In one embodiment, a UE can be scheduled with a sidelink transmission, wherein the scheduled sidelink transmission can be located within the same period for a semi-static mode channel access as the SCI format that schedules the sidelink transmission, and the scheduled sidelink transmission can be determined to be associated with the UE's channel occupancy or another UE's channel occupancy based on the indication, and the UE can further determine at least the sensing procedure according to the embodiments and examples of the present disclosure.

In one embodiment, if the UE is indicated that the scheduled sidelink transmission is associated with a channel occupancy by another UE (e.g., UE #1 in the example of the present disclosure), and if the UE is indicated to perform the sidelink transmission without sensing, the UE can apply CP extension if applicable and perform the transmission without sensing.

In another embodiment, if the UE is indicated that the scheduled sidelink transmission is associated with a channel occupancy by another UE (e.g., UE #1 in the example of the present disclosure), and if the UE is indicated to perform the sidelink transmission with sensing (e.g., sensing with a duration of $T_{sl}$ within an interval (e.g., 25 us)), at least one of the following example can be applied.

In one example, the UE can perform the sensing with a duration of $T_{sl}$ within an interval (e.g., 25 us), and if the sensing is idle, the UE can perform the sidelink transmission.

In another example, the UE can perform the sensing with a duration of $T_{sl}$ within an interval (e.g., 25 us), and if the sensing is busy, the UE can drop the sidelink transmission.

In yet another example, if the UE can determine that the gap between the sidelink transmission and the previous sidelink transmission is no larger than 16 us, the UE can perform the sidelink transmission without sensing.

In yet another example, if the UE can determine that the gap between the sidelink transmission and the previous sidelink transmission is larger than 16 us, the UE can perform the sensing with a duration of $T_{sl}$ within an interval (e.g., 25 us), and if the sensing is idle, the UE can perform the sidelink transmission.

In yet another example, if the UE can determine that the gap between the sidelink transmission and the previous sidelink transmission is larger than 16 us, the UE can perform the sensing with a duration of $T_{sl}$ within an interval (e.g., 25 us), and if the sensing is busy, the UE can drop the sidelink transmission.

In yet another embodiment, if the UE is indicated that the scheduled sidelink transmission is associated with a channel occupancy by the UE (e.g., UE #2 in the example of the present disclosure) and the UE is indicated to perform the sidelink transmission with sensing (e.g., sensing with a duration of $T_{sl}$ within an interval (e.g., 25 us)), and if the sidelink transmission may occur at the beginning of a period (e.g., and may end before the idle duration corresponding to that period), wherein the period $T_{period}$ is for the UE's own semi-static mode channel access, at least one of the following example can be applied.

In one example, the UE performs the sensing with a duration of $T_{sl}$ immediately before the sidelink transmission, and if the sensing is idle, the UE can perform the sidelink transmission.

In another example, the UE performs the sensing with a duration of $T_{sl}$ immediately before the sidelink transmission, and if the sensing is busy, the UE can drop the sidelink transmission.

In yet another embodiment, if the UE is indicated that the scheduled sidelink transmission is associated with a channel occupancy by the UE (e.g., UE #2 in the example of the present disclosure) and the UE is indicated to perform the sidelink transmission with sensing (e.g., sensing with a duration of $Ts_{sl}$ within an interval (e.g., 25 us)), and if the sidelink transmission may occur after the beginning of a period (e.g., and may end before the idle duration corresponding to that period), wherein the period $T_{period}$ is for the UE's own semi-static mode channel access, at least one of the following example can be applied.

In one example, if the UE has not initiated a channel occupancy in that period, the UE can drop the sidelink transmission.

In another example, if the UE has initiated a channel occupancy in that period, the UE can perform the sensing with a duration of $T_{sl}$ within an interval (e.g., 25 us), and if the sensing is idle, the UE can perform the sidelink transmission.

In yet another example, if the UE has initiated a channel occupancy in that period, the UE can perform the sensing with a duration of $T_{sl}$ within an interval (e.g., 25 us), and if the sensing is busy, the UE can drop the sidelink transmission.

In yet another example, if the UE has initiated a channel occupancy in that period, if the UE can determine that the gap between the sidelink transmission and the previous sidelink transmission is no larger than 16 us, the UE can perform the sidelink transmission without sensing.

In yet another example, if the UE has initiated a channel occupancy in that period, if the UE can determine that the gap between the sidelink transmission and the previous sidelink transmission is larger than 16 us, the UE can perform the sensing with a duration of $T_{sl}$ within an interval (e.g., 25 us), and if the sensing is idle, the UE can perform the sidelink transmission.

In yet another example, if the UE has initiated a channel occupancy in that period, if the UE can determine that the gap between the sidelink transmission and the previous sidelink transmission is larger than 16 us, the UE can perform the sensing with a duration of $T_{sl}$ within an interval (e.g., 25 us), and if the sensing is busy, the UE can drop the sidelink transmission.

In one embodiment, a UE can be scheduled with a sidelink transmission, wherein the scheduled sidelink transmission can be located within different period for a semi-static mode channel access from the SCI format that schedules the sidelink transmission, and the scheduled sidelink transmission can be determined to be associated with the UE's channel occupancy or another UE's channel occupancy according to the embodiments and examples in the present disclosure.

In one embodiment, if the UE is indicated that the scheduled sidelink transmission is associated with a channel occupancy by another UE (e.g., UE #1 in the example of the present disclosure), and if the UE is indicated to perform the sidelink transmission without sensing, at least one of the following example can be applied.

In one example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, the UE assumes the scheduled sidelink transmission is associated with a channel occupancy initiated by the another UE, and applies CP extension if applicable and performs the scheduled sidelink transmission without sensing.

In another example, if the scheduled sidelink transmission may occur at the beginning of a period $T'_{period}$ or may not end before the idle duration corresponding to that period (e.g., overlap with the idle duration), wherein the period $T'_{period}$ is for another UE's semi-static mode channel access (e.g., UE #1 in the example of the present disclosure), the UE drops the scheduled sidelink transmission.

In yet another example, if the UE cannot determine that another UE has initiated a channel occupancy in the period $T'_{period}$ and shares its channel occupancy to the UE according to examples described in the present disclosure, the UE drops the scheduled sidelink transmission.

In one embodiment, if the UE is indicated that the scheduled sidelink transmission is associated with a channel occupancy by another UE (e.g., UE #1 in the example of the present disclosure), and if the UE is indicated to perform the sidelink transmission with sensing, at least one of the following example can be applied.

In one example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, the UE assumes the scheduled sidelink transmission is associated with a channel occupancy initiated by the another UE, and performs sensing with a duration of $T_{sl}$ within an interval (e.g., 25 us), and if the sensing is idle, the UE can perform the sidelink transmission.

In another example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, the UE assumes the scheduled sidelink transmission is associated with a channel occupancy initiated by the another UE, and performs sensing with a duration of $T_{sl}$ within an interval (e.g., 25 us), and if the sensing is busy, the UE can drop the sidelink transmission.

In yet another example, if the scheduled sidelink transmission may occur at the beginning of a period $T'_{period}$ or may not end before the idle duration corresponding to that period (e.g., overlap with the idle duration), wherein the period $T'_{period}$ is for another UE's semi-static mode channel access (e.g., UE #1 in the example of the present disclosure), the UE drops the scheduled sidelink transmission.

In yet another example, if the UE cannot determine that another UE has initiated a channel occupancy in the period $T'_{period}$ and shares its channel occupancy to the UE according to examples described in the present disclosure, the UE drops the scheduled sidelink transmission.

In yet another example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, and if the UE can determine that the gap between the sidelink transmission and the previous sidelink transmission is no larger than 16 us, the UE can perform the sidelink transmission without sensing.

In yet another example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, and if the UE can determine that the gap between the sidelink transmission and the previous sidelink transmission is larger than 16 us, the UE can perform the sensing with a duration of $T_{sl}$ within an interval (e.g., 25 us), and if the sensing is idle, the UE can perform the sidelink transmission.

In yet another example, if the scheduled sidelink transmission may occur after the beginning of a period $T'_{period}$ and may end before the idle duration corresponding to that period, wherein the period $T'_{period}$ is for another UE's semi-static mode channel access (e.g., UE #1 in the example of the present disclosure), and if the UE determines the another UE has initiated a channel occupancy in the period $T'_{period}$ and shares its channel occupancy to the UE according to examples described in the present disclosure, and if the UE can determine that the gap between the sidelink transmission and the previous sidelink transmission is larger than 16 us, the UE can perform the sensing with a duration of $T_{sl}$ within an interval (e.g., 25 us), and if the sensing is busy, the UE can drop the sidelink transmission.

In yet another embodiment, if the UE is indicated that the scheduled sidelink transmission is associated with a channel occupancy by the UE (e.g., UE #2 in the example of the present disclosure) and the UE is indicated to perform the sidelink transmission with sensing (e.g., sensing with a duration of $T_{sl}$ within an interval (e.g., 25 us)), and if the sidelink transmission may occur at the beginning of a period and may end before the idle duration corresponding to that period, wherein the period $T_{period}$ is for the UE's own semi-static mode channel access, at least one of the following example can be applied.

In one example, the UE performs the sensing with a duration of $T_{sl}$ immediately before the sidelink transmission, and if the sensing is idle, the UE can perform the sidelink transmission.

In another example, the UE performs the sensing with a duration of $T_{sl}$ immediately before the sidelink transmission, and if the sensing is busy, the UE can drop the sidelink transmission.

In yet another embodiment, if the UE is indicated that the scheduled sidelink transmission is associated with a channel occupancy by the UE (e.g., UE #2 in the example of the present disclosure) and the UE is indicated to perform the sidelink transmission with sensing (e.g., sensing with a duration of $T_{sl}$ within an interval (e.g., 25 us)), and if the sidelink transmission may occur after the beginning of a period and may end before the idle duration corresponding to that period, wherein the period $T_{period}$ is for the UE's own semi-static mode channel access, at least one of the following example can be applied.

In one example, if the UE has not initiated a channel occupancy in that period, the UE can drop the sidelink transmission.

In another example, if the UE has initiated a channel occupancy in that period, the UE can perform the sensing with a duration of $T_{sl}$ within an interval (e.g., 25 us), and if the sensing is idle, the UE can perform the sidelink transmission.

In yet another example, if the UE has initiated a channel occupancy in that period, the UE can perform the sensing with a duration of $T_{sl}$ within an interval (e.g., 25 us), and if the sensing is busy, the UE can drop the sidelink transmission.

In yet another example, if the UE has initiated a channel occupancy in that period, if the UE can determine that the gap between the sidelink transmission and the previous sidelink transmission is no larger than 16 us, the UE can perform the sidelink transmission without sensing.

In yet another example, if the UE has initiated a channel occupancy in that period, if the UE can determine that the gap between the sidelink transmission and the previous sidelink transmission is larger than 16 us, the UE can perform the sensing with a duration of $T_{sl}$ within an interval (e.g., 25 us), and if the sensing is idle, the UE can perform the sidelink transmission.

In yet another example, if the UE has initiated a channel occupancy in that period, if the UE can determine that the gap between the sidelink transmission and the previous sidelink transmission is larger than 16 us, the UE can perform the sensing with a duration of $T_{sl}$ within an interval (e.g., 25 us), and if the sensing is busy, the UE can drop the sidelink transmission.

In one embodiment, a channel access procedure applies for multiple sidelink transmissions in a semi-static mode channel access.

In one example, if a UE is scheduled to transmit a set of consecutive sidelink transmissions in a channel occupancy, the UE applies the indicated CP extension to the first sidelink transmission.

In another example, if a UE is scheduled to transmit a set of consecutive sidelink transmissions in a channel occupancy, the UE applies the indicated CP extension to each of the sidelink transmissions.

In yet another example, if a UE is scheduled to transmit a set of consecutive sidelink transmissions in a channel occupancy, and the UE transmits one of the sidelink transmissions in the set after a channel access procedure as described in the present disclosure, the UE can continue transmitting the remaining sidelink transmissions in the set without sensing the channel.

In yet another example, the UE assumes any scheduled or configured sidelink transmission(s) within the same sidelink transmission burst is associated with the same channel occupancy initiated by a UE.

In yet another example, the UE assumes the scheduled sidelink transmission(s) by the same DCI format are associated with the same channel occupancy initiated by a UE.

In yet another example, the UE assumes the scheduled sidelink transmission(s) by the same SCI format are associated with the same channel occupancy initiated by a UE.

In one embodiment, a channel access procedure applies for multi-channel transmissions in a semi-static mode channel access.

In one example, if a UE intends to transmit on a set of channels, the UE may start the transmissions on the set of channels at the same time.

In another example, if a UE intends to transmit on a set of channels, the UE perform channel access procedure according to example in the present disclosure on each of the channel independently.

In yet another example, the UE may not start transmission on any of the channel in the set of channels, if the UE fails the channel access procedure on at least one of the channels. In one further example, this example applies to the scenario that the UE is not provided with a configuration of the intra-cell guard band.

In yet another example, if a UE intends to transmit on a set of channels, and the UE is scheduled or configured to transmit on a subset of the channels, the UE may not transmit on any channel in the subset of the channels, if the UE fails to access the corresponding channel.

In yet another example, the UE may assume that the transmissions in the set of channels are associated with a channel occupancy initiated by a same UE.

FIG. 11 illustrates a flowchart of UE method 1100 for channel occupancy sharing in a semi-static mode sidelink channel access according to embodiments of the present disclosure. For example, the UE method 1100 as may be performed by a UE such as 111-116 as illustrated in FIG. 1. An embodiment of the UE method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one embodiment, an example UE procedure for channel occupancy sharing in a semi-static mode sidelink channel access is shown in FIG. 11. When a UE may perform a sidelink transmission (1101), the UE determines the channel occupancy that is associated with the sidelink transmission (1102), and further determines whether it is allowed to perform the sidelink transmission in the determined associated channel occupancy (1103). Upon determining it is allowed to perform the sidelink transmission in the determined associated channel occupancy, the UE performs channel access procedure (1104), and upon successfully performing the channel access procedure, the UE performs the sidelink transmission (1105).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to:
      receive, from a higher layer, an indication on a semi-static mode sidelink (SL) channel access; and
      receive a set of configurations for the semi-static mode SL channel access, wherein the set of configurations includes a duration of a period; and
   a processor operably coupled to the transceiver, the processor configured to:
      determine a first portion of the period as a channel occupancy associated with the period;
      determine a second portion of the period as an idle duration associated with the period; and
      perform a SL channel access procedure in the idle duration associated with the period,
   wherein the transceiver is further configured to transmit a first SL transmission over a channel in the channel occupancy associated with the period after successfully performing the SL channel access procedure, and
   wherein a set of orthogonal frequency division multiplexing (OFDM) symbols overlapping with the idle duration are not used for SL transmissions or SL receptions.

2. The UE of claim 1, wherein:
   a starting time instance of the channel occupancy is aligned with a starting time instance of the period,
   a maximum channel occupancy time is determined as $0.95 \cdot T_{period}$, and $T_{period}$ is the duration of the period.

3. The UE of claim 1, wherein:
   an ending time instance of the idle duration is aligned with an ending time instance of the period,
   a length of the idle duration is determined as min $(0.05 \cdot T_{period}, 100 \text{ μs})$, and
   $T_{period}$ is the duration of the period.

4. The UE of claim 1, wherein:
   the SL channel access procedure includes the channel to be sensed as idle in a sensing slot with a duration $T_{sl}$, and
   an ending time instance of the SL channel access procedure is aligned with a starting time instance of the channel occupancy.

5. The UE of claim 1, wherein the first SL transmission starts from a starting time instance of the channel occupancy.

6. The UE of claim 1, wherein the set of OFDM symbols are not selected for SL transmissions in a SL resource reservation procedure.

7. The UE of claim 1, wherein:
   the processor is further configured to determine a size of a gap between an ending time instance of the first SL transmission and a starting time instance of a second SL transmission; and
   the transceiver is further configured to transmit the second SL transmission over the channel without sensing the channel, when the size of the gap is no larger than a duration $T_{sl}$.

8. The UE of claim 7, wherein the transceiver is further configured to transmit the second SL transmission over the channel, when the size of the gap is larger than the duration $T_{sl}$ and the channel is sensed to be idle for the duration $T_{sl}$ immediately before the second SL transmission.

9. The UE of claim 1, wherein the processor is further configured to:

determine a size of a gap between an ending time instance of the first SL transmission and a starting time instance of a second SL transmission by another UE; and indicate the other UE to transmit the second SL transmission over the channel without sensing the channel, when the size of the gap is no larger than a duration $T_{sl}$.

10. The UE of claim 9, wherein the processor is further configured to indicate the other UE to transmit the second SL transmission over the channel after the channel is sensed to be idle for the duration $T_{sl}$ immediately before the second SL transmission, when the size of the gap is larger than the duration $T_{sl}$.

11. A method of a user equipment (UE) in a wireless communication system, the method comprising:
   receiving, from a higher layer, an indication on a semi-static mode sidelink (SL) channel access;
   receiving a set of configurations for the semi-static mode SL channel access, wherein the set of configurations includes a duration of a period;
   determining a first portion of the period as a channel occupancy associated with the period;
   determining a second portion of the period as an idle duration associated with the period;
   performing a SL channel access procedure in the idle duration associated with the period; and
   transmitting a first SL transmission over a channel in the channel occupancy associated with the period after successfully performing the SL channel access procedure,
   wherein a set of orthogonal frequency division multiplexing (OFDM) symbols overlapping with the idle duration are not used for SL transmissions or SL receptions.

12. The method of claim 11, wherein:
   a starting time instance of the channel occupancy is aligned with a starting time instance of the period,
   a maximum channel occupancy time is determined as $0.95 \cdot T_{period}$, and
   $T_{period}$ is the duration of the period.

13. The method of claim 11, wherein:
   an ending time instance of the idle duration is aligned with an ending time instance of the period,
   a length of the idle duration is determined as min $(0.05 \cdot T_{period}, 100 \text{ μs})$, and
   $T_{period}$ is the duration of the period.

14. The method of claim 11, wherein:
   the SL channel access procedure includes the channel to be sensed as idle in a sensing slot with a duration $T_{sl}$, and
   an ending time instance of the SL channel access procedure is aligned with a starting time instance of the channel occupancy.

15. The method of claim 11, wherein the first SL transmission starts from a starting time instance of the channel occupancy.

16. The method of claim 11, wherein the set of OFDM symbols are not selected for SL transmissions in a SL resource reservation procedure.

17. The method of claim 11, further comprising:
   determining a size of a gap between an ending time instance of the first SL transmission and a starting time instance of a second SL transmission; and
   transmitting the second SL transmission over the channel without sensing the channel, when the size of the gap is no larger than a duration $T_{sl}$.

18. The method of claim 17, further comprising transmitting the second SL transmission over the channel, when the size of the gap is larger than the duration $T_{sl}$ and the channel is sensed to be idle for the duration Ts immediately before the second SL transmission.

19. The method of claim 11, further comprising:

determining a size of a gap between an ending time instance of the first SL transmission and a starting time instance of a second SL transmission by another UE; and indicating the other UE to transmit the second SL transmission over the channel without sensing the channel, when the size of the gap is no larger than a duration $T_{sl}$.

20. The method of claim 19, further comprising indicating the other UE to transmit the second SL transmission over the channel after the channel is sensed to be idle for the duration $T_{sl}$ immediately before the second SL transmission, when the size of the gap is larger than the duration $T_{sl}$.

* * * * *